(12) United States Patent
Didcock

(10) Patent No.: US 7,835,512 B2
(45) Date of Patent: Nov. 16, 2010

(54) CALL ROUTING BASED ON USER AVAILABILITY

(75) Inventor: Clifford Neil Didcock, Wantage (GB)

(73) Assignee: Avaya UK, Surrey (GB)

( * ) Notice: Subject to any disclaimer, the term of this patent is extended or adjusted under 35 U.S.C. 154(b) by 1577 days.

(21) Appl. No.: 10/888,369

(22) Filed: Jul. 9, 2004

(65) Prior Publication Data

US 2005/0163301 A1   Jul. 28, 2005

(30) Foreign Application Priority Data

Jan. 22, 2004   (EP) .................................. 04250345

(51) Int. Cl.
*H04M 3/42*   (2006.01)

(52) U.S. Cl. .............................. 379/221.01; 379/88.19; 379/88.21; 379/211.02; 379/212.01; 455/414.1; 455/415; 455/417

(58) Field of Classification Search ................ 379/67.1, 379/201.01, 88.19, 88.2, 201.1, 211.02, 212.01, 379/221.01
See application file for complete search history.

(56) References Cited

U.S. PATENT DOCUMENTS

| | | | |
|---|---|---|---|
| 5,329,578 A * | 7/1994 | Brennan et al. | 379/211.03 |
| 5,487,111 A * | 1/1996 | Slusky | 379/211.03 |
| 5,946,386 A | 8/1999 | Rogers et al. | |
| 6,005,870 A * | 12/1999 | Leung et al. | 370/466 |
| 6,069,946 A * | 5/2000 | Lieuwen | 379/211.01 |
| 2003/0142807 A1 | 7/2003 | Dolan et al. | |

FOREIGN PATENT DOCUMENTS

| | | |
|---|---|---|
| EP | 0 837 611 A2 | 4/1998 |
| EP | 1 280 080 A1 | 1/2003 |
| EP | 04 25 0345 | 6/2004 |
| WO | WO 00/60840 | 10/2000 |

* cited by examiner

*Primary Examiner*—Fan Tsang
*Assistant Examiner*—Khai N Nguyen
(74) *Attorney, Agent, or Firm*—Chapin IP Law, LLC; David W. Rouille, Esq.

(57) ABSTRACT

There is disclosed a method of routing a call in a communication system, comprising: defining a set of availability modes for at least one user, each mode including at least one identifier identifying at least one originating telephone number; defining a routing rule for each of said modes; and routing a call for the at least one user in dependence upon the routing rule associated with an active availability mode of the user and the originating telephone number of the call.

21 Claims, 2 Drawing Sheets

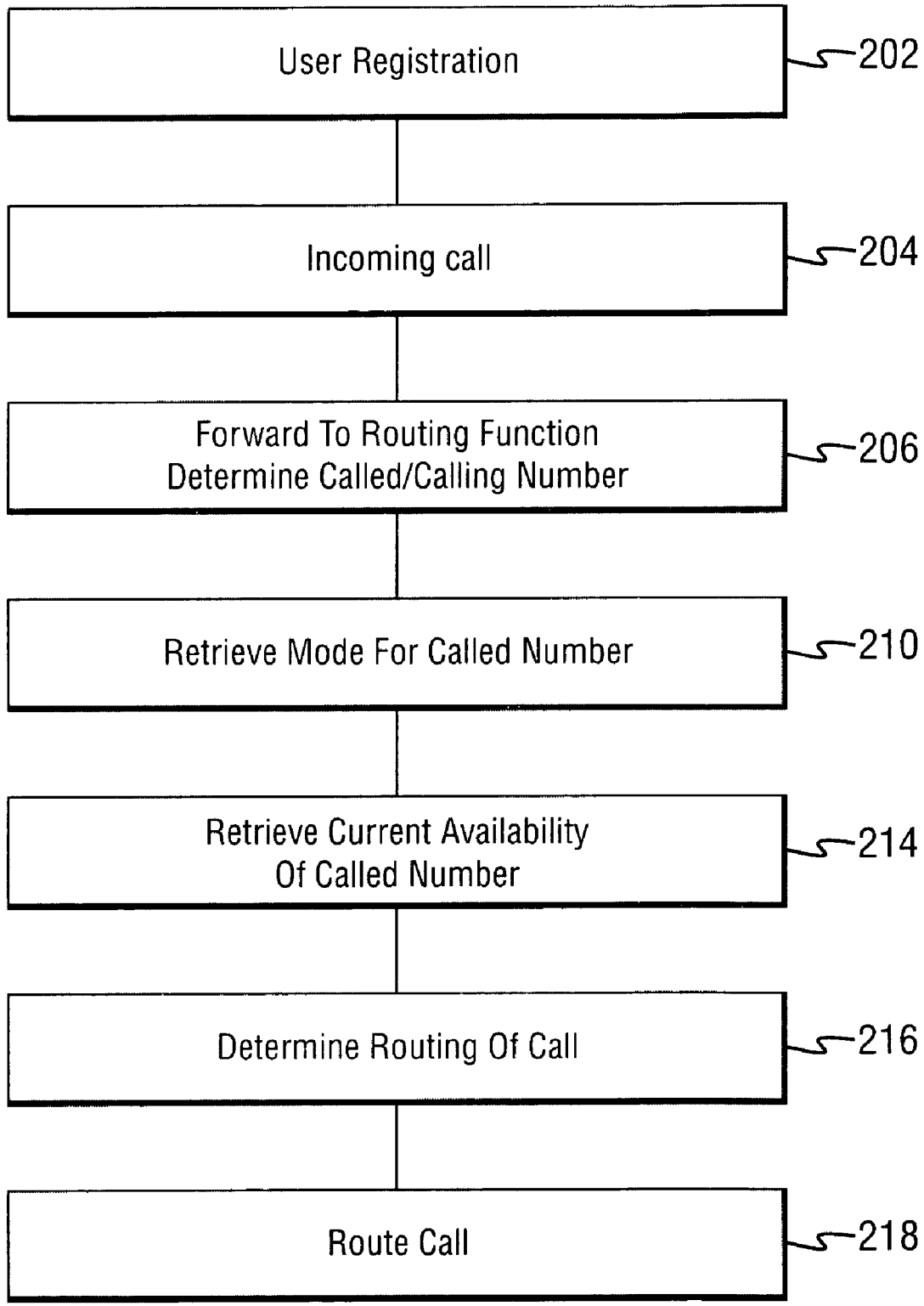

CALL ROUTING BASED ON USER AVAILABILITY

RELATED APPLICATION(S)

The present application claims the priority of European Patent Application No. 04250345.8 filed Jan. 22, 2004 and entitled "Call Routing Based on User Availability."

FIELD OF THE INVENTION

The invention relates to communication systems, and particularly the routing of calls in communication systems. The invention is particularly, but not exclusively, concerned with telephony systems.

BACKGROUND TO THE INVENTION

Telephones typically have a single Boolean control for signaling the user's availability. This can be exemplified by a mobile/cellular phone. If the phone is turned-on, then the user is considered available. If the phone is turned-off, then the user is considered not available. Similarly PBX (private branch exchange) extensions have a 'Do-Not-Disturb' or 'Send-All-Calls' state to ensure either all incoming calls are received or all incoming calls are not presented.

The only control available to a telephone user today for them to choose whether they are interrupted by phone calls operates on all calls unselectively. If a user makes himself available, e.g. switches on a mobile phone, or programs their handset to clear any do-not-disturb state, then any and all calls placed to their extension will ring the phone.

After the call is established, and placed to their phone, the calling party information may be supplied to the called party, e.g. on the phone display. The called user can then elect to ignore the call, or even explicitly manually redirect it.

The disadvantage of this technique is that the operation:
 a) causes an interruption to the called user, and
 b) results in specific feedback to the caller, possibly allowing them to tell that their call was rejected and hence risking causing offence.

The problem with this technique is made worse when the billing implications of some mobile phone networks are considered. For instance a GSM phone which is enabled for 'roaming' incurs charges for inbound calls (while roaming). A phone user may only want to incur these charges for certain calls (from certain callers).

It is an aim of the invention to provide an improved technique which addresses one or more of the above described problems.

SUMMARY OF THE INVENTION

Embodiments of the invention describes a granular mechanism for defining and controlling an availability state.

In embodiments, there is provided a method of routing a call to a user in dependence on at least one user defined rule.

In summary the invention and embodiments thereof preferably provide a technical solution by providing functionality, associated with a switching function such as a private branch exchange, for an incoming call to be selectively routed in a plurality of ways in dependence on a set of user defined preferences, by storage of such preferences and a comparison of a current or active user preference to a stored preference for the handling of a call from a given source.

In an aspect, the invention provides a method of routing a call in a communication system, comprising: defining a set of availability modes for at least one user, each mode including at least one identifier identifying at least one originating telephone number; defining a routing rule for each of said modes; and routing a call for said at least one user in dependence upon the routing rule associated with an active availability mode of said user and the originating telephone number of said call.

The step of routing the call may be dependent upon the originating telephone number corresponding to the at least one identifier of the active availability mode. If the originating telephone number matches the at least one identifier of the active availability mode the call is preferably routed to the user. If the originating telephone number does not match the at least one identifier of the active availability mode the call is preferably routed to a voice mail box of the user.

The set of availability modes may be hierarchical, the at least one identifier of each availability mode being included in a higher availability mode. The set of availability modes may be independent. The active availability mode of the user may comprise a plurality of availability modes.

Each availability mode may have a plurality of sub-modes, each sub-mode including at least one identifier identifying at least one originating telephone number, wherein a routing rule is defined for each of said sub-modes.

The identifier may identify an international dialing code, or an area code, or a set of telephone numbers.

Said availability modes may be user defined or automatically defined. The automatic definition of the user availability modes may be based on a calendar function and/or a clock function. Thus, at certain times of day a particular availability mode may automatically apply.

In another aspect the invention provides a call routing device, comprising: storage means for storing a set of availability modes for at least one user, each mode including at least one identifier identifying at least one originating telephone number; storage means for storing a routing rule for each of said modes; input means for receiving a call to said at least one user; determining means for determining the originating telephone number of said received call and an active availability mode of said user; and routing means for routing a call for said at least one user in dependence upon the routing rule associated with the active availability mode of said user and the originating telephone number of said call.

The call routing device may further comprise enabling means for enabling the routing means responsive to the originating telephone number corresponding to the at least one identifier of the active availability mode.

The routing means may further include comparison means for comparing the originating telephone number to the at least one identifier of the active availability mode, wherein responsive to a match the call is routed to the user.

The routing means may further include comparison means for comparing the originating telephone number to the at least one identifier of the active availability mode, wherein if there is no match the call is routed to a voice mail box of the user.

The set of availability modes may be hierarchical, the at least one identifier of each availability mode being included in a higher availability mode.

The set of availability modes may be independent.

The active availability mode of the user may comprise a plurality of availability modes.

Each availability mode may have a plurality of sub-modes, each sub-mode including at least one identifier identifying at least one originating telephone number, wherein a routing rule is defined for each of said sub-modes.

The identifier may identify either an international dialing code, or an area code, or a set of telephone numbers.

Said availability modes may be user defined or automatically defined.

In a still further aspect, the invention provides a method of routing a call in a communication system, comprising: receiving a telephone call; determining a calling number and a called number of said call; accessing a set of availability modes in dependence on said called number; determining at least one availability mode associated with said calling number; determining an active availability of said called number; and routing said call in dependence upon a comparison of the at least one availability mode associated with the calling number and the active availability of the called number.

Preferably, responsive to a match between the at least one availability mode associated with the calling number and the active availability of the called number the call is routed to the called number.

Preferably, if there is no match between the at least one availability mode associated with the calling number and the active availability of the called number the call is routed to a voice mail number associated with the called number.

In general, in dependence upon the comparison of the at least one availability mode associated with the calling number and the active availability of the called number a routing rule associated with the at least one availability mode associated with the calling number is applied.

BRIEF DESCRIPTION OF THE DRAWINGS

The invention is now described by way of example with reference to the accompanying drawings, in which:

FIG. 2 illustrates a flow process in an embodiment of the invention.

DESCRIPTION OF PREFERRED EMBODIMENTS

Figure 1:
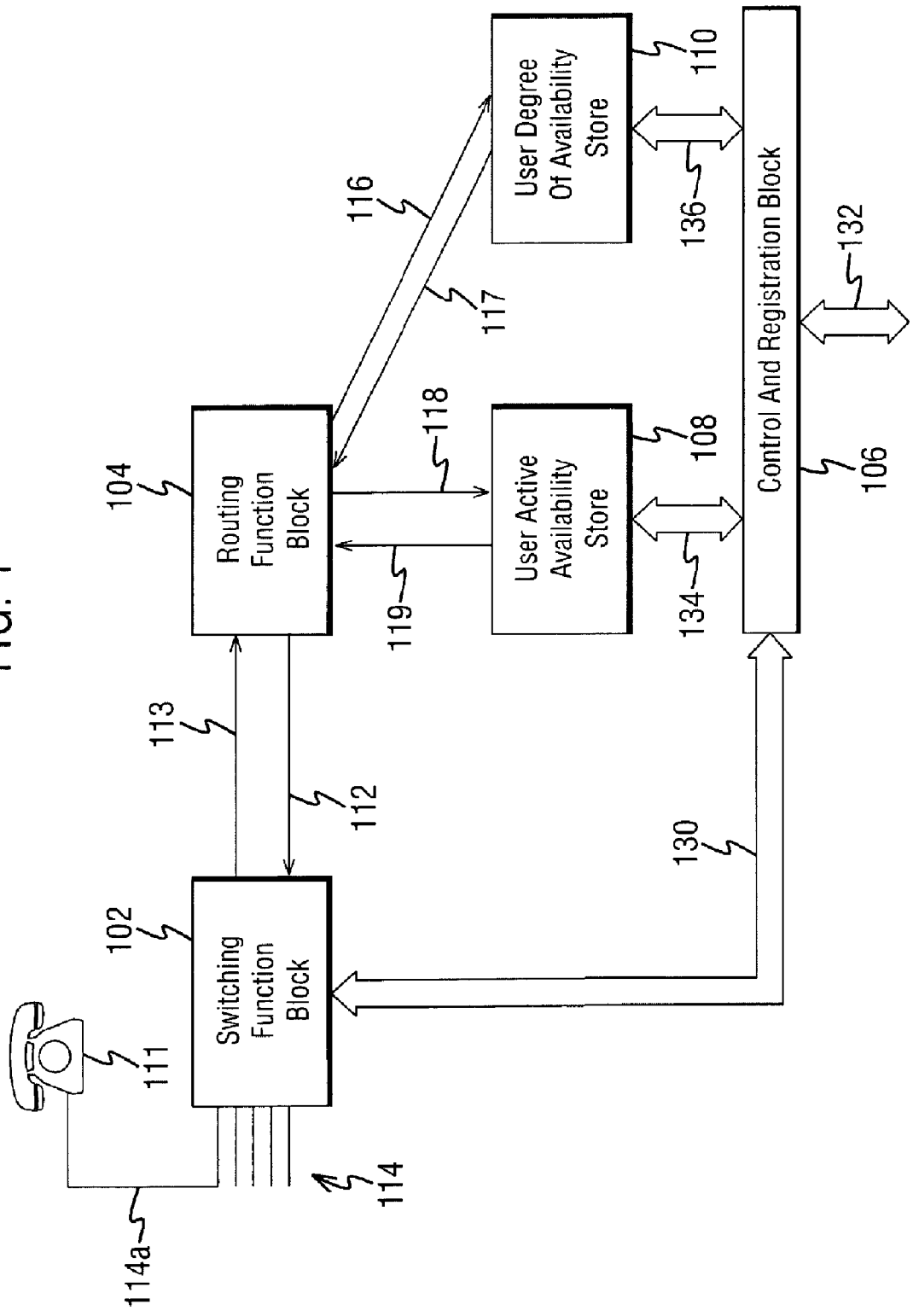
FIG. 1 illustrates an exemplary system overview for implementation of an embodiment of the invention.

In accordance with embodiments of the invention, a phone user is able to define, at any time, a more granular 'degree of availability'. The degree of availability may be defined in a number of ways. Two exemplary ways of defining a granular degree of availability are discussed below, to illustrate the invention.

1. In a first arrangement, the degree of availability may be defined as a range of increasingly restricted degrees of availability. This enables the user to define a mode of use. Examples of degrees of availability are set out as follows. Table I below illustrates an example configuration.

a. 'FullyAvailable'

In this mode, the user receives all calls made to their handset, in the conventional manner for when a telephone handset is turned on and the 'do not disturb' feature is disabled. This mode of operation requires no specific setting up by a user, as it does not require any restrictions to incoming calls to be applied. Referring to the first row of Table I, in this mode all calls may be accepted.

b. 'HighlyAvailable'

In this mode, the user may allow caller access to a large set of callers. The user may define one or more specific numbers from which he does not wish to receive calls. This is illustrated in the second row of Table I, in this mode all calls except a set of user defined specific identified numbers may be accepted. Alternatively the user may define a broad range of numbers from which calls may be received. For example, a user may in this mode receive all calls which are associated with certain specific area or country codes.

c. 'SelectivelyAvailable'

In this mode, the user may allow caller access to all but a defined, but relatively large, set of callers. The user may define a set of numbers from which he does not wish to receive calls. Alternatively the user may define a set of numbers from which calls may be received. As illustrated in the third row of Table I, in this mode a user may define that all enterprise originating calls are accepted, but no other calls.

d. 'VerySelectivelyAvailable'

In this mode, the user may allow caller access to a defined, relatively small, set of callers. The user may for example define one or more specific numbers from which he does not wish to receive calls. For example, a UK based enterprise user may in this mode receive all calls which originate from other UK based enterprise offices, e.g. local enterprise callers, as illustrated in the fourth row of Table I.

e. 'EmergencyOnly'

In this mode, the user may define one or more specific numbers from which calls are received. This may, for example, be the user's home telephone number or area code. Illustrated in the fifth row of Table I is an example in which the user defines the country code (e.g. "44") and area code "nnn" of the number, and all calls from that area code are received.

f. 'Unavailable'

In this mode, the user's handset is unable to receive incoming calls; although may be used to place outbound calls. This is illustrated in the sixth row of Table I.

The earlier degrees defined in this first example arrangement are a strict superset of the later, such that 'FullyAvailable' defines a degree of availability that includes all of 'HighlyAvailable', etc. Thus for example a call from a defined emergency number is accepted when the set mode is 'VerySelectivelyAvailable'.

TABLE I

| Mode | Calls Accepted |
| --- | --- |
| FullyAvailable | All Calls |
| HighlyAvailable | All Calls Except Specific Identified Numbers |
| SelectivelyAvailable | Enterprise Originating Calls |
| VerySelectivelyAvailable | Local Enterprise Originating Calls |
| EmergencyOnly | +44 nnn mmm xxxx |
| Unavailable | No Calls |

Thus, as set out in Table I, a user is able to set a number of modes or configurations (or 'degrees of availability') for their telephone, such that incoming calls are handled in a desired manner in a user-defined way. Preferably the user sets three or more modes of operation. Once the modes are established, then at any given time the user may select a particular mode of operation.

As discussed above, the example described in relation to Table I is an example where each higher mode is a strict superset of lower modes, or each lower mode is a subset of a higher mode. The described example thus defines a set of hierarchical modes or configurations. In an alternative arrangement, each mode or configuration may be fully independently defined. This is explained below with reference to a second example.

2. In a second example arrangement, there is provided unconnected modes or named degrees of availability. This could be created by an end-user and be highly personalized, such as:
   a. 'FamilyandFriends'
   In this mode or named group, the user may define a set of numbers which are the caller numbers for various family and friends.
   b. 'BusinessInternal'
   In this mode or named group, the user may define a set of numbers which are the caller numbers for work colleagues within their own enterprise. This may be a defined set of numbers. Alternatively this may define an area code—or multiple area codes—from which all calls are received (or barred), the area code being the area code of the geographical location of an enterprise.
   c. 'Customers'
   In this mode or named group the user may define a set of numbers of customers or business contacts.
   In this second arrangement, each mode is independent, and the definition of modes is not hierarchical as in the first arrangement. The user may select, or enable one or more modes at any one time.

It can be seen that the principles of the two example arrangements described above are the same, insofar as a number of groups are defined, and within each group there is defined at least one telephone number or a class of telephone numbers. The telephone numbers may be for a collection of people having a common characteristic, such as family, the telephone numbers themselves having no common characteristic. The telephone numbers may have a common characteristic, e.g. an area code.

The modes, configurations, or degrees of availability suggested above are populated such that the equipment receiving the call can, in conjunction with a users 'active degree of availability', interpret the users preferred handling for each call. Specifically each degree of availability preferably contains a list of callers or caller-groups. For example, if a user's home telephone area code is nnn, the user may define all calls received from that area code as part of their 'EmergencyOnly' group. Some individual customer-contacts may be placed into the SelectivelyAvailable group, as well as a generic group.

The population of each degree of availability may be best performed using a visual user interface. A web browser interface is an obvious model for a mobile phone network provider to allow its subscribers to perform this configuration.

Having defined a set of modes, configurations, or degrees of availability in accordance with one or both of the above described techniques or possible further techniques, a user may declare an 'active degree of availability' at any particular time. Thus a user may select a current mode of operation. In the first arrangement, by selecting one mode all sub-modes are automatically included. Therefore only one mode need be selected, and the system may be configured such that selection of only one mode at any one time is facilitated. In the second arrangement a user may, in a preferable arrangement, define more than one mode to select a range of numbers for receiving calls from.

The selection of a mode of operation may be managed from a computer calendar program, for example, with some defaults applied for work-hours, commute time and personal time. Thus, for example, default modes may apply at certain times of day, in accordance with user preferences. Specific calendar entries may over-write these defaults to cover meetings etc.

In such an arrangement, during normal work hours, e.g. 9:00 am to 5:00 pm, and referring to the first example described above, a user may have a default setting linked to a calendar/clock program associated with their telephone handset to automatically select the mode FullyAvailable.

Alternatively, the user may dynamically and explicitly select a particular degree of availability at any time using their telephone handset, or a browser interface. For instance, a mobile phone user may be prompted to select their degree of availability at the time the phone is turned on.

Referring now to FIG. 1 there is illustrated an example implementation embodiment of the invention in a PBX (Private branch exchange) system environment. One skilled in the art will understand that the arrangement of FIG. 1 is not a full PBX implementation. A full PBX implementation will be familiar to one skilled in the art, and FIG. 1 shows only those functional elements necessary for understanding an implementation of an embodiment of the invention.

As illustrated in FIG. 1, the system of the embodiment includes a switching function block 102, a routing function block 104, a control and registration block 106, a user active availability storage block 108 for storing an active degree of availability for each system user or subscriber, and a degree of availability storage block 110 for storing a set of degrees of availability for each system user or subscriber.

In the PBX system example, the switching function block 102 is a PBX. In alternative embodiments the switching function block may be provided by central office switches, or in a mobile communications system by mobile/cellular switches.

The key functionality of the switching function block 102 for implementing embodiments of the invention is that it handles inbound calls, and connects those calls to a programmed destination using a routing function.

The routing function block 104 is used by the switching function 102 to determine how to handle at least some incoming calls.

A user or subscriber of the PBX associated with the switching function block 102 may utilise embodiments of the invention to enable preferred call routing. This functionality may be available to all users or subscribers, or may require users or subscribers to specifically register for the service. In an embodiment, a registration operation may request 'routing control' for a particular destination telephone number. Such registration may preferably be initiated by a user associated with the destination telephone number. The registration process is handled by the control and registration block 106.

Once this registration is complete, subsequent calls made to the registered telephone number result in the switching function block 102 querying the routing function block 104. The routing function block 104 responds to such a query operation with a query-response describing how the switching function should complete the incoming call, specifically the routing function block 104 provides the switching function block 102 with a number to which the call should be directed, in dependence on the availability mode of operation of the telephone handset associated with the destination number. The query-response preferably contains a phone number to which the call should be routed. In dependence on the rule defined, this may for example be the actual destination telephone number.

Users create a static set of degrees of availability (such as Table I above), which are stored in the storage block 110. Thus, for each registered user, the storage block contains a set of modes, configurations, or degrees of availability. These may, for example, be a set of modes for each user such as illustrated in Table I above. An implementation may be modeled on top of existing per-user 'contact' management contained within applications such as Microsoft Outlook, Lotus Notes or mobile telephone devices. Contacts are individual people-records that are typically used for addressing e-mail messages. They can, however, also be groups of people, or so-called 'distribution lists'. A 'degree of availability' is a specialized group of people or 'types of person', which are afforded the same degree of access and priority when making routing decisions.

The storage block 110 allows a user to store created 'degrees of availability' groups, each populated with individual contacts/people (identified by their telephone numbers), and/or types of person—identified by, for example, partial telephone numbers.

The storage block 110 is provided with a query interface 116 allowing the routing function block 104 to supply a source and a destination telephone number and retrieve the 'degree of availability' for that source telephone number from the set of modes for that destination telephone number, if any. The current degree of availability, mode or configuration of the handset associated with the destination telephone number is then returned on interface 117 to the routing function 104.

Thus the stored set of modes for the destination number are accessed. Whilst in the preferred embodiment the information is accessed in the storage function 108 in dependence on the destination number, it is envisaged that other forms of caller identification may also be used.

When a stored set of modes for a user is accessed in the storage block 110, such user may be considered to be a 'served user'. The 'served user' preferably selects their current availability so that any calls to the user are processed in a way determined by the user. The user may select their current availability through some form of explicit real-time selection interface. This may, for example, be selected via a web browser, or micro-browser/WAP interface.

Alternatively the user may use a scheduler/calendar mechanism (with an explicit override). A user may select a 'degree of availability' to cover their weekly movements. It is envisaged that a user may select different degrees of availability in dependence on their commute hours, work hours, break time and evenings/weekends for example. Consider a calendar application such as that provided through Microsoft Outlook. Each meeting appointment can have a degree of availability associated. Critical one-to-one meetings may be given a Degree of Availability of "Emergency Only", while company-wide broadcast meetings a Degree of Availability of "Highly Available".

The current availability of each user is stored in the storage block 108. After the 'degree of availability', mode, or configuration associated with the calling number is retrieved from the storage block 110, the 'active degree of availability', or mode or configuration of the handset associated with the destination number is retrieved from the storage block 108 by sending a request on interface 118 and receiving a reply on interface 119. The degree of availability associated with the calling number can then be compared to a retrieved current availability to determine how to route the call.

An example operation is now described with further reference to FIG. 1 in conjunction with an exemplary flow process shown in FIG. 2.

Referring to FIG. 2, in a step 202 a user of a PBX registers for call routing in accordance with the invention. The user is assumed to be associated with a telephone terminal 111 which is connected to the switching function block 102 via one of the connection lines, denoted 114a. The registration process may require a user entering a code through their telephone handset 111. Alternatively the user may register for the routing function via a computer interface on a computer terminal (not shown).

As shown in FIG. 1, the switching function block 102 may be connected to the control and registration block 106 via a control interface 130. This allows, in embodiments, for registration of a user to take place using the telephone handset 111 via the switching function block 102 to the control and registration block 106.

In alternatives, registration may take place by static administration or through a computer network. It is envisaged that the registration for services provided in accordance with embodiments of the invention may be consistent with techniques for registering for other PBX services, for example.

In addition, and as further discussed hereinbelow, the control interface 130 may also be used by the user associated with the telephone handset 111 to communicate a current availability.

In a mobile telephony application, a microbrowser or WAP interface may be used to register for the service.

As also shown in FIG. 1, the control and registration block 106 is further provided with interface 132. The interface 132 is to a computer network, to which computer terminals are connected. Via such interface, a user may use a computer in order to set up the routing functionality in accordance with the invention. This interface may also be provided for an administrator or system controller to establish registration of individual users or groups of users.

In setting up the routing functionality, the user establishes a set of modes, configurations or degrees of availability which groups telephone numbers or classes of telephone numbers into distinct groups, as discussed hereinabove. This set of modes may, for example, be in accordance with either of the configuration arrangements described above. For example, the user may set up a set of user defined modes similar to Table I above. Alternatively, as discussed in the second arrangement hereinabove, the user may establish a set of user defined modes which are independent. Once established, the modes, configurations, or degrees of availability for the user are stored in the storage block 110 under the control of the control and registration block 106 through the interface 136.

After registration, and establishment of a plurality of user defined modes, at any time the user may select a particular mode as the user's current availability. This may be done, for example, through the user entering a code in the telephone terminal 111, which is communicated to the user active availability store 108 via the control interface 130 and an interface 134 between the control and registration block 106 and the user active availability store 108. Alternatively, and as mentioned hereinabove, the current availability of the user may be determined dynamically through, for example, a calendar tool running on the user's computer. In this way, the current availability of the user is provided by the computer network interface 132 to the control and registration block 106, which current availability is communicated to the user current availability store 108 on user interface 134.

As such, the user degree of availability store 110 stores the degree of availability for all users, and the user active availability store 108 stores the current availability for all users.

Referring to FIG. 2, an exemplary implementation of the operation of the system of FIG. 1 in accordance with the invention is described. The registration process described hereinabove is denoted by step 202. Once the user has registered, and established a set of modes or degrees of availability, the thus established modes may be used for routing calls to that user.

In step 204, an incoming call is received on the PSDN lines 114 to the switching function block 102. In a step 206, certain details of such incoming call are forwarded to the routing function block 104 on line 113. In this exemplary embodiment of the invention, the information forwarded to the routing function block comprises the called number and the calling number.

The routing function block 104 then determines the routing of the incoming call. In a step 210, the routing function block 104 transmits a request signal on line 116 to the user degree of availability store 110. The request signal includes the called number, so that the appropriate set of modes can be identified, and the calling number, so that the mode to which that number belongs within that set can be identified. In this way, the routing mode for the calling number to the called number is retrieved on line 117 from the store 110, and provided to the routing function block 104. The retrieval of this information may be by way of a simple look up function, with the called number being provided to the store 110, and responsive thereto the appropriate set of modes, or degrees of availability, being accessed. The calling number is then applied to this set of modes to retrieve the mode associated with that number. It should be noted that in the first example described above, with reference to Table I, it is the highest mode to which the calling number belongs which is returned. In the second example, if the calling number belongs to multiple modes then multiple modes may be returned to the routing function block 104.

For example, if the routing rules for the called number are as set out in Table I above, and if the calling number is an enterprise originating call, then it is determined that the mode or degree of availability for the calling number is SelectivelyAvailable. This mode is then returned to the routing function block 104.

In the described example, the storage means 110 returns the mode, or modes, for the called number with which the calling number is associated (if any). In an alternative, the storage means 110 may be adapted to receive only the destination number from the routing function block 104, and return the set of modes for the destination number. The routing function block may then determine the mode with which the calling number is associated.

In a step 214, the routing function block 104 then sends a request on line 118 to the user active availability store 108 to retrieve the current availability of the called number (i.e. the user). This current availability is returned as a response on line 119 to the routing function block 104. For the purposes of the described example, it is assumed that the current availability status of the user, or current mode, is VerySelectivelyAvailable.

In a step 216 the routing function block 104 then determines the appropriate routing of the call. Specifically, the routing function block determines whether the current degree of availability of the user permits calls from the called number. Thus, the degree of availability of the calling number is compared to the current degree of availability of the called number. In the described example, the call falls into the 'SelectivelyAvailable' category, whilst the user is in the 'VerySelectivelyAvailable' mode. As such, the call cannot be routed to the called number. The call must therefore be routed to a voice mail number associated with the called number.

In a step 218 the routing function block 104 returns a routing command on a line 112 to the switching block function 102. In the present example, the command is to route the call to a voicemail number, and simply returns to the switching function block 102 the number of the voice mail system. The command on line 112 from the routing function block 104 to the switching function block 102 is preferably always a number to which the call should be routed.

In the embodiments described herein, the routing of the call is either to the called number (when permitted by the routing rules), or alternatively to a voicemail number. It is envisaged that in further embodiments there may be provided further modes or degrees of availability, in which a call is routed to a specific alternative number or numbers. Thus the invention is not limited to an arrangement where the routing of the calls is a choice between a specific called number or a specific voice mail number. For example, the call may be routed to a delegate.

As such, the modes associated with each user may further be associated with a number, being the number to which the call should be routed when that mode of operation is selected. For example, a modification to the first example of FIG. 1 above may be envisaged in which when the user is in VerySelectivelyAvailable mode, calls from numbers within the SelectivelyAvailable mode are directed to a delegate, such as a co-worker, and calls from numbers in the HighlyAvailable mode are directed to voice mail. Thus, when a user is in any given mode it may be possible to define multiple ways for calls from different calling numbers to be treated.

If in step 210 the user associated with the called number is not registered for the routing service in accordance with the invention, an appropriate signal may be returned on line 117 to the routing function block 104, and the switching function block 102 may be controlled to route the call in a conventional manner. The indication from the user degree of availability store 110 may well be by indication of an error signal on line 117 to the routing function block 104.

The lines 112 and 113 between the switching function block 102 and the routing function block 104 provide an interface for advantageously interfacing the functionality of the invention to the switching function block. However, such routing function interface as provided by the lines 112 and 113 may not always be present in a flexible manner within existing switches. Where such interface is not provided in a usable manner, an alternative implementation may be provided. In such alternative implementation, an incoming call may be routed to a called telephone number in the usual manner, and in the event that the telephone is not answered then the call may be routed, via existing 'call coverage' mechanisms, to a device which provides the functionality in accordance with the present invention, being a device equivalent to the routing function block 104. This may, for instance, be implemented within a voicemail system as part of 'Call Answering' logic.

As a result of embodiments of the invention, users are given much more granular control over which calls may reach their handset at any particular time. This has the potential to result in much improved customer satisfaction when used in conjunction with PBX systems, and has considerable end-user cost implications when used in conjunction with mobile/cellular phones. People who today either leave their phone off, or risk paying for unwanted calls, will be able to use their phone in a more controlled manner.

This invention may also be extended into the area of Instant Messaging, managing IM-interrupts.

The invention, and embodiments thereof, is relevant to enterprise systems, public fixed line systems and mobile phone networks.

The invention has been described herein by way of reference to particular exemplary embodiments. The invention is not limited to any specific details of any of the described embodiments. The scope of protection afforded by the invention is defined in the appended claims.

The invention claimed is:

1. A method of routing a call in a communication system, comprising:
   storing at least a first set of availability modes, each mode of the first set including at least one identifier identifying at least one originating telephone number;
   storing at least a second set of availability modes, each mode of the second set including at least one identifier identifying at least one user associated with at least one destination telephone number;
   determining at least a first availability mode based at least in part on the originating telephone number of the call;
   determining at least a second availability mode based at least in part on the user associated with the destination telephone number of the call;
   routing the call based at least in part on the determined at least first and at least second availability modes;
   wherein at least one of said first and second availability modes includes sub-modes such that each said sub-modes can be selected for routing said call;
   selecting an availability mode for routing said call automatically activate any sub-modes under the selected mode.

2. A method according to claim 1 wherein the step of routing the call is dependent upon the originating telephone number corresponding to the at least one identifier of the first availability mode.

3. A method according to claim 2 wherein if the originating telephone number matches the at least one identifier of the first availability mode the call is routed to the user.

4. A method according to claim 2 wherein if the originating telephone number does not match the at least one identifier of the first availability mode the call is routed to a voice mail box of the user.

5. A method according to claim 1 wherein at least one identifier identifies an international dialing code, or an area code.

6. A method according to claim 1 wherein at least one identifier identifies a set of telephone numbers.

7. A method according to claim 1 wherein said availability modes are user defined.

8. A call routing device, comprising:
   first storing means for storing at least a first set of availability modes, each mode of the first set including at least one identifier identifying at least one originating telephone number;
   second storing means for storing at least a second set of availability modes, each mode of the second set including at least one identifier identifying at least one user associated with at least one destination number;
   first determining means for determining at least a first availability mode based at least in part on the originating telephone number of the call;
   second determining means for determining at least a second availability mode based at least in part on the user associated with the destination telephone number of the call; and
   routing means, operative to route the call based at least in part on the determined at least first and at least second availability modes;
   wherein at least one of said first and second availability modes includes sub-modes such that each said sub-modes can be selected for routing said call;
   selecting an availability mode for routing said call automatically activate any sub-modes under the selected mode.

9. The call routing device of claim 8 further comprising enabling means for enabling the routing means responsive to the originating telephone number corresponding to the at least one identifier of the first availability mode.

10. The call routing device of claim 9 wherein the routing means further includes comparison means for comparing the originating telephone number to the at least one identifier of the first availability mode, wherein responsive to a match the call is routed to the user.

11. The call routing device of claim 9 wherein the routing means further includes comparison means for comparing the originating telephone number to the at least one identifier of the first availability mode, wherein if there is no match the call is routed to a voice mail box of the user.

12. The call routing device of claim 8 wherein at least one availability mode has a plurality of sub-modes, each sub-mode including at least one identifier identifying at least one originating telephone number, wherein a routing rule is defined for each of said sub-modes.

13. The call routing device of claim 8 wherein at least one identifier identifies either an international dialing code, or an area code, or a set of telephone numbers.

14. An apparatus for routing a call in a communication system, comprising:
   at least one storage element for storing at least a first set of availability modes, each mode of the first set including at least one identifier identifying at least one originating telephone number and for storing at least a second set of availability modes, each mode of the second set including at least one identifier identifying at least one user associated with at least one destination telephone number;
   at least one functional element for determining at least a first availability mode based at least in part on the originating telephone number of the call and for determining at least a second availability mode based at least in part on a user associated with a destination telephone number of the call; and
   at least one switch for routing the call based at least in part on the determined at least first and at least second availability modes;
   wherein at least one of said first and second availability modes includes sub-modes such that each said sub-modes can be selected for routing said call;
   selecting an availability mode for routing said call automatically activate any sub-modes under the selected mode.

15. The apparatus of claim 14 wherein routing the call is dependent upon the originating telephone number corresponding to the at least one identifier of the first availability mode.

16. The apparatus of claim 15 wherein if the originating telephone number matches the at least one identifier of the first availability mode the call is routed to the user.

17. The apparatus of claim 15 wherein if the originating telephone number does not match the at least one identifier of the first availability mode the call is routed to a voice mail box of the user.

18. The apparatus of claim 14 wherein at least one availability mode has a plurality of sub-modes, each sub-mode including at least one identifier comprising at least one telephone number, wherein a routing rule is defined for each of said sub-modes.

19. The method of claim 1 wherein said automatically defined availability modes are managed dynamically by a computer calendar program.

20. The device of claim 8 wherein said automatically defined availability modes are managed dynamically by a computer calendar program.

21. The apparatus of claim 14 wherein said automatically defined availability modes are managed dynamically by a computer calendar program.

* * * * *